United States Patent
Wohlgemuth

(10) Patent No.: US 8,385,374 B1
(45) Date of Patent: Feb. 26, 2013

(54) MULTILANE COMMUNICATION DEVICE

(75) Inventor: Aron Wohlgemuth, Givat Shmuel (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 199 days.

(21) Appl. No.: 12/816,127

(22) Filed: Jun. 15, 2010

Related U.S. Application Data

(60) Provisional application No. 61/225,755, filed on Jul. 15, 2009.

(51) Int. Cl.
*H04J 3/06* (2006.01)

(52) U.S. Cl. ........ 370/509; 370/464; 370/465; 370/503; 370/510; 370/511

(58) Field of Classification Search ................ 370/392, 370/464, 465, 503, 509, 510, 511
See application file for complete search history.

(56) References Cited

U.S. PATENT DOCUMENTS

| | | | | |
|---|---|---|---|---|
| 4,608,684 | A * | 8/1986 | Upp | 370/368 |
| 6,654,370 | B1 * | 11/2003 | Quirke et al. | 370/389 |
| 7,010,607 | B1 * | 3/2006 | Bunton | 709/228 |
| 7,193,994 | B1 * | 3/2007 | Payson | 370/380 |
| 2002/0001305 | A1 * | 1/2002 | Hughes et al. | 370/369 |
| 2003/0194999 | A1 * | 10/2003 | Quick et al. | 455/435.1 |
| 2004/0267951 | A1 * | 12/2004 | Hattori | 709/231 |
| 2008/0138075 | A1 * | 6/2008 | Gustlin et al. | 398/115 |
| 2009/0141844 | A1 * | 6/2009 | Tripathi | 375/372 |

* cited by examiner

*Primary Examiner* — Dang Ton
*Assistant Examiner* — Robert M Morlan

(57) ABSTRACT

A multilane communication device and methods for using the multilane communication device. In one embodiment, a physical coding sub-layer module comprising includes multiple data transfer lanes in a port of a multi-lane Ethernet switch for transferring blocks of data between devices in the port. The physical coding sub-layer module further includes a synchronization marker generator for generating synchronization markers to be periodically transmitted over the multiple data transfer lanes. The physical coding sub-layer module further includes a data marker module configured to generate at least two data marker blocks from a respective portion of a synchronization marker and a respective portion of a block of data, and to provide the at least two data marker blocks to respective first and second ones of the multiple of data transfer lanes.

20 Claims, 10 Drawing Sheets

MULTILANE COMMUNICATION DEVICE

CROSS-REFERENCE TO RELATED APPLICATION

This application claims the benefit of U.S. Provisional Patent Application No. 61/225,755, filed on Jul. 15, 2009, entitled "Sub MLD," the entire disclosures of which is hereby incorporated by reference herein.

FIELD OF THE DISCLOSURE

The present disclosure relates generally to communication networks and, more particularly, to communication devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, Ethernet is widely used in backbone links of computer networks that range from small home networks to large enterprise networks. Many modern Ethernet links already support data rates of 1 Gb (i.e., one gigabit per second). However, due to the ever-increasing demand for faster networks and higher bandwidth, the IEEE 802.3ba task force is currently developing a standard that applies to 40 Gb and 100 Gb links. Some existing integrated circuits and interface devices cannot support the high data rates proposed by the IEEE 802.3ba task force.

SUMMARY

The present disclosure provides various embodiments of a multilane communication device and methods for using the multilane communication device.

In one embodiment, a physical coding sub-layer module comprising includes multiple data transfer lanes in a port of a multi-lane Ethernet switch for transferring blocks of data between devices in the port. The physical coding sub-layer module further includes a synchronization marker generator for generating synchronization markers to be periodically transmitted over the multiple data transfer lanes. The physical coding sub-layer module further includes a data marker module configured to generate at least two data marker blocks from a respective portion of a synchronization marker and a respective portion of a block of data, and to provide the at least two data marker blocks to respective first and second ones of the multiple of data transfer lanes.

In another embodiment, a method for transmitting data using a physical coding sub-layer module includes generating a first data marker using a first portion of a synchronization marker and a first portion of a data block, where the synchronization marker and the data block are associated with a first stream. The method further includes generating a second data marker using a second portion of the synchronization marker and a second portion of the data block. The method further includes transmitting the first data marker via a first lane to a target device in a second stream. The method further includes transmitting the second data marker via a second lane to the target device in a third stream parallel to the second stream.

In another embodiment, an Ethernet switch includes an input to receive a first stream of blocks of symbols including a synchronization marker and a data block. The Ethernet switch further includes a first output to transmit a second stream of blocks of symbols via a first data transfer lane. The Ethernet switch further includes a second output to transmit a third stream of blocks of symbols via a second data transfer lane. The Ethernet switch further includes a data marker module configured to generate at least a first data marker from a first portion of the synchronization marker and a second portion of the data block and a second data marker from a second portion of the synchronization marker and a first portion of the data block, and provide the at least the first data marker and the second marker to the first output and the second output respectively.

In another embodiment, an apparatus includes a pair of inputs to receive a first data stream and a second data stream respectively. The apparatus further includes a pair of state machines, each coupled to the respective input. The apparatus further includes a controller configured to merge the first data stream with the second data stream. Each of the pair of state machines is configured to detect a portion of a synchronization marker in a block of symbols transmitted in the respective first or second data stream. Each of the pair of state machines is further configured to provide an indication to the controller that the portion of the synchronization marker has been received. Each of the pair of state machines is further configured to prevent blocks of symbols in the respective first or second stream to be propagated until the controller indicates that the synchronization marker has been fully received.

BRIEF DESCRIPTION OF THE DRAWINGS

Like reference numbers and designations in the various drawings indicate like elements. Furthermore, when individual elements are designated by references numbers in the form Nm, these elements may be referred to collectively by N. For example, FIG. 1 illustrates Tx sub-MLDs 50a, 50b, 50c, 50d, and two or more of such Tx sub-MLDs may be referred to collectively as handsets Tx sub-MLDs 50.

DETAILED DESCRIPTION

Example distribution, alignment, and synchronization methods and apparatus are described herein in the context of an Ethernet communication device, such as a 40 gigabit Ethernet switch device. It is noted that in light of the disclosure and teachings herein, similar methods and apparatus can be utilized in the context of other communication protocols and switching/routing devices, including, without limitation, Ethernet devices of 20 gigabits and higher.

As used herein, the term "stream" will generally refer to a logical collection of data, and a stream may be divided into multiple sub-streams that are smaller logical collections of data. Additionally, as used herein, the term "lane" refers to a physical medium (e.g., a wire), via which streams, or sub-streams may be transmitted, typically within the physical layer of a port. Further, as used herein, the term "channel" refers to a structure (e.g., a trace) within a device that facilitates transmission of streams and sub-streams, and that may include a lane (or lanes) and other elements that facilitate transmission of streams, or sub-streams, via the channel.

Figure 1A:
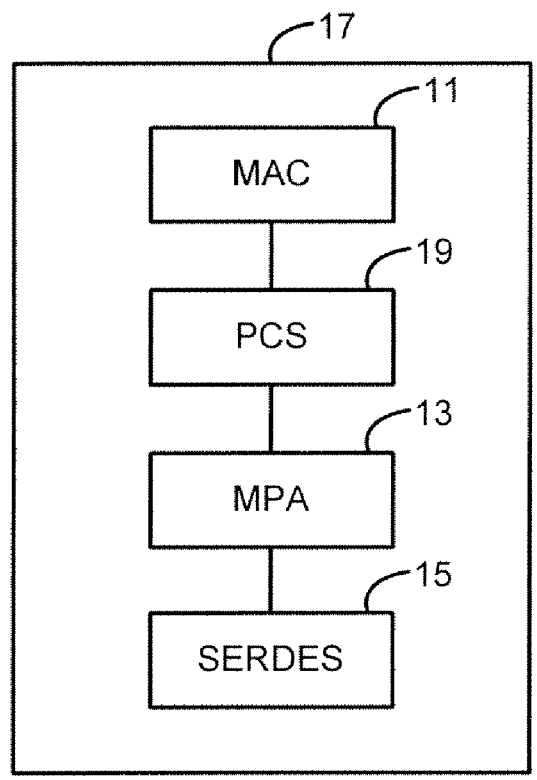
FIG. 1A is a block diagram of a port of a multilane communication device in accordance with an embodiment of the present disclosure.
Figure 1B:
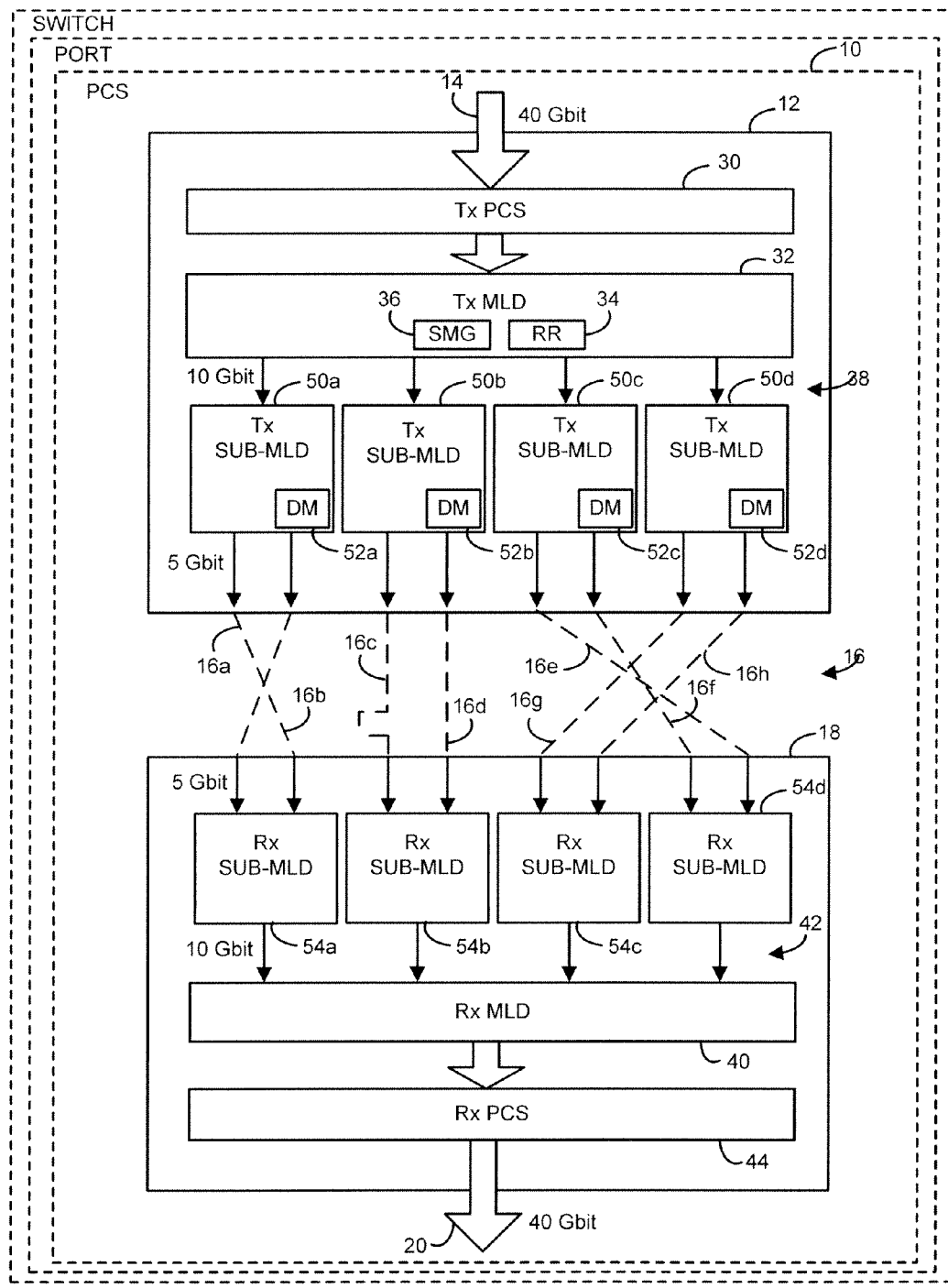
FIG. 1B is a block diagram of a circuit in which a transmit multi-lane distribution (MLD) module (Tx MLD) and a receive MLD module (Rx MLD) are utilized in accordance with an embodiment of the present disclosure.

FIG. 1A illustrates a port 17 of a multilane communication device, according to an embodiment. The port 17 includes a media access controller (MAC) block 11, a physical coding sublayer (PCS) block 19, a physical medium attachment (PMA) block 13, and a serialization/deserialization (SERDES) block 15. As will be described in more detail below, the PCS block includes multilane capabilities FIG. 1B illustrates a physical coding sublayer (PCS) block 10 that may be used in a port of a multilane communication device (such as port 17 of FIG. 1A). More generally, the PCS 10 is used in an Ethernet switch, for example, in which a transmit (Tx) data module 12 receives an XLGMII (i.e., 40 Gb) data stream via a an input 14, splits the received data stream into several parallel lower-rate data streams to accommodate bandwidth limitations of the hardware internal to the PCS 10, and transmits the lower-rate data streams in parallel via eight 5 Gb physical lanes 16 to a receive (Rx) data module 18 that subsequently reassembles the lower-rate data streams into a single XLGMII stream 20. A coding sub-layer module (Tx PCS) 30 partitions the XLGMII data stream into 66-bit data blocks (or "words") and forwards the 66-bit data blocks to a multi-lane distribution controller (Tx MLD) 32 that includes a distribution controller 34 and a synchronization marker generator 36. The distribution controller 34 evenly distributes (e.g., by way of round-robin or other suitable distribution mechanism) the data blocks among four parallel 10 Gb lanes 38 with a separation by several inter-packet gap (IPG) symbols. In an embodiment, the IPG symbols form a predetermined pattern.

In general, it cannot be assumed that 66-bit data blocks transmitted in parallel from the Tx MLD 32 are received at an Rx MLD 40 at precisely the same time (i.e., with perfect alignment) because it is common for some of the lanes 16 to differ in length, as schematically illustrated in FIG. 1. The resulting loss of synchronization between the lanes 16 can be referred to as "skewing." To ensure that a receiver of the data blocks can restore alignment between blocks received in parallel on several lanes, the synchronization marker generator 36 inserts, e.g., periodically, synchronization markers (also referred to as "alignment markers" or simply "markers"), each of which includes a synchronization header (e.g., a 2-bit header) and a respective pre-defined pattern (e.g., of 64 bits), into each lower-rate data stream, according to an embodiment. In some embodiments, the Rx MLD 40 makes room for the synchronization markers by periodically deleting IPG symbols from the XLGMII data stream. The Rx MLD 40 then uses the synchronization markers to align the data blocks arriving via four 10 Gb lanes 42 prior to forwarding the data blocks to an Rx PCS module 44, according to an embodiment.

Because the lanes 16 are limited to the data rate of about 5 Gb each, the traffic in each of the lanes 38 is further split at a respective Tx sub-MLD 50a-d. Generally, each Tx sub-MLD 50a-d evenly distributes data blocks among the respective pairs of lanes 16a-b, 16c-d, 16e-f, or 16g-h in a suitable manner, e.g. round-robin, for example by switching the lane within the pair every time a data block is transmitted, according to an embodiment. However, when the Tx sub-MLD 50a-d receives a data marker via one of the lanes 38, a corresponding data marker module 52c-d splits the data marker into a first portion that includes the 32 most significant bits of the data marker and a second portion that includes the 32 least significant bits of the data marker. The data marker module 52c-d similarly splits the data block that immediately follows the data marker, transmits the first portion of the data marker with a second portion of the data block via one of the lanes 16 coupled to the corresponding Tx sub-MLD 50a-d, and transmits the first portion of the data block with the second portion of the data marker via the other one of lanes 16 coupled to the Tx sub-MLD 50a-d.

As a result, in an embodiment, the data marker module 52c-d effectively mixes a synchronization marker with a data block to generate two combined marker and data blocks (marker/data blocks). As will be discussed in more detail below, each of the two marker/data blocks is used as a marker on a 5 Gb lane, and the synchronization header of each marker/data block may be set to a control type to signal the presence of marker data. From another perspective, each of the two marker/data blocks includes a shorter marker that is nevertheless sufficient to align the two 5 Gb streams because a 5 Gb lane generally has a lower probability of a bit error than a 10 Gb lane (because in general, higher data rates are associated with higher data rates due to the scarcity of bandwith). Rx sub-MLD modules 54a-d recognize the marker/data blocks received via the corresponding pairs of lanes 16 and restore the original markers and the data blocks prior to forwarding the markers and the data blocks to the Rx MLD module 40.

In addition to the difference in length between some of the lanes 16, e.g., the lanes 16c and 16d, the lanes need not be connected in the same position at the receiving end, according to an embodiment. As an example, in FIG. 1, the output of the Tx sub-MLD 50c is coupled to the Rx sub-MLD 54d, and the output of the Tx sub-MLD 50d is coupled to the Rx sub-MLD 54c. Further, lanes can be crossed within each pair of lanes 16a and 16b, 16c and 16d, etc., according to an embodiment. For example, in FIG. 1, the lanes 16a and 16b are crossed but the lanes 16c and 16d are connected directly between the Tx sub-MLD 50b and the Rx sub-MLD 54b. In the embodiment of FIG. 1, each pair of lanes 16a and 16b, 16c and 16d, etc. is connected, in a straight or a cross-over manner, to a common Rx sub-MLD module 54a-d.

Although not shown in FIG. 1 for ease of explanation, the Tx data module 12 in at least some of the embodiments includes a separate serializer/de-serializer (SERDES) module for each of the lanes 16. Similarly, each Rx data module 18 in these embodiments includes a dedicated SERDES module for each of the lanes 16. The SERDES modules of the Tx data module 12 and the Rx data module 18 define respective endpoints to which the lanes 16 are coupled. As explained above in reference to FIG. 1A, in some embodiments, a SERDES block 15 may be a separate from the PCS 10 within a port 17.

To support flexible connections between components on the PCS 10, the data processors 12 and 18 utilize markers that identify the relative position of each stream. In this manner, the data module 18 can restore the relative order of data blocks received via the lanes 16.

In an embodiment, each of the Tx data module 12 and the Rx data module 18 is a switching device, and the PCS 10 is used in a network device (e.g., a bridge, a router, a network switch). Further, in some embodiments, the Tx data module 12 and the Rx data module 18 are disposed on different PCBs and are interconnected via a fabric card, for example. Moreover, various components and/or units illustrated in or described in reference to FIG. 1B may be combined or, alternatively, divided into distinct units.

Figure 2:
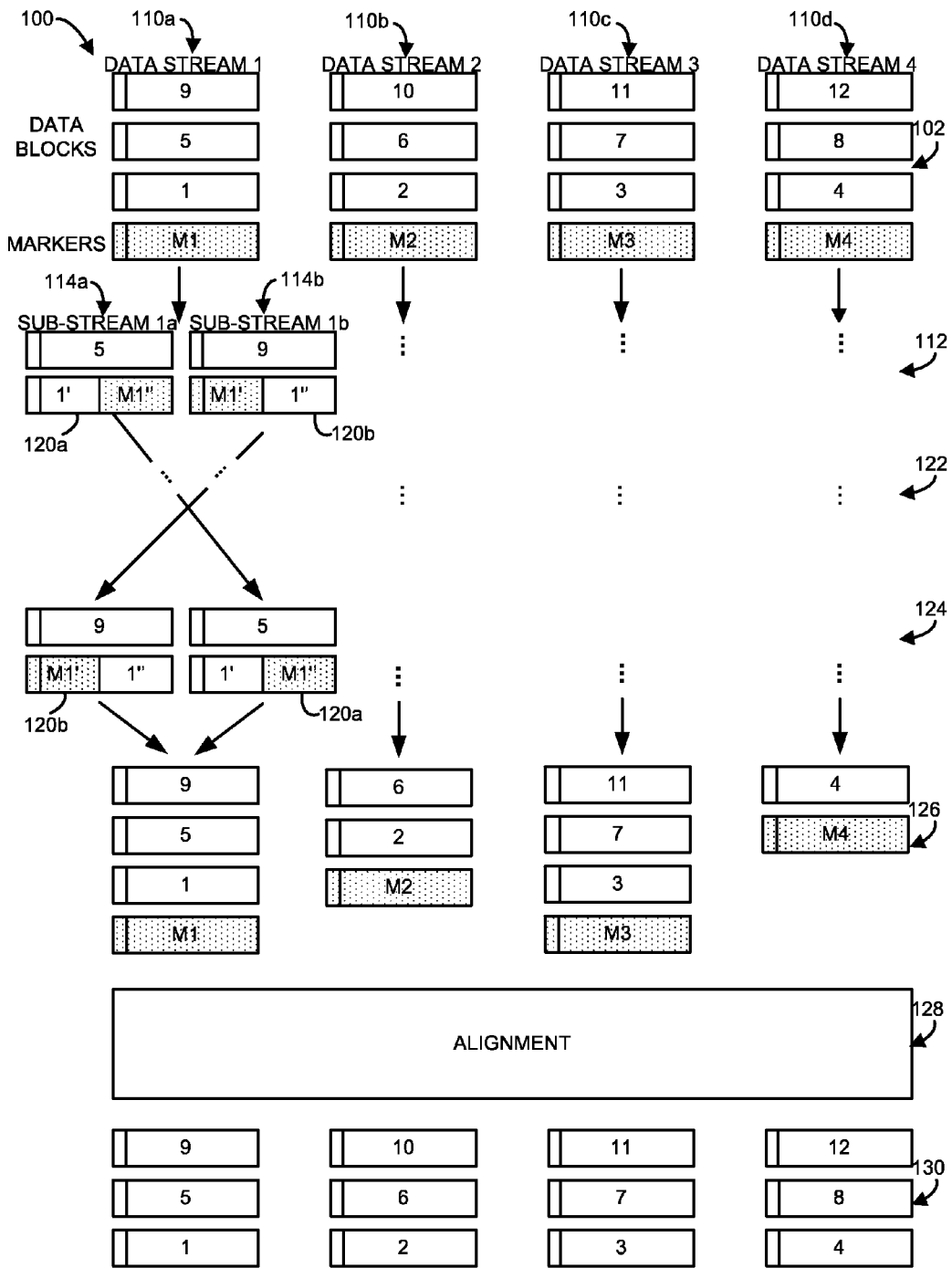
FIG. 2 is a block diagram that illustrates transmission of data blocks and alignment markers over multiple lanes in accordance with an embodiment of the present disclosure.

FIG. 2 illustrates an example transmission of data blocks and alignment markers over multiple lanes, where a single data stream has been partitioned into the data blocks and the alignment markers have been added for use in reassembling the data blocks into a single data stream, according to an embodiment. The example scenario 100 of FIG. 2 can be implemented by the system illustrated in FIG. 1B. However, it is noted that the example scenario 100 of FIG. 2 can also be implemented by other suitable systems.

In the scenario 100, the single data stream has been partitioned into 12 consecutive data blocks (labeled 1 through 12). In an embodiment, each data block 1-12 includes 64 bits of data and a 2-bit synchronization header. The data blocks 1-12 are distributed over four lanes at a stage 102 to define four streams 110a-d. A respective marker M1-M4 is transmitted in each of the streams 110a-d before a respective data block 1, 2, 3, or 4. It is noted that data markers can be transmitted at any necessary frequency (e.g., after every 16,384 data packets). Further, in an embodiment, markers M1-M4 include any suitable pattern that can be recognized at the receiving processing unit. In an embodiment, each of the markers M1 and M4 includes a respective lane identifier that a receiving processing unit can use to restore the relative order of data blocks that follow the markers. In another embodiment, however, the markers do not include lane identifiers. For example, in an embodiment, the markers M1-M4 can be identical. In an embodiment in which identical markers are used, the system may prohibit out-of-order connections (such as the connection between Tx sub-MLD 50c and Rx sub-MLD 54d).

At a stage 112, the four streams 110a-d are further divided into respective pairs of sub-streams. For ease of illustration, FIG. 2 depicts only sub-streams 114a and 114b into which the stream 110a is divided. In particular, the data block 1 and the data marker M1 are used to define data/marker blocks 120a and 120b. The data/marker block 120a includes the 32 most significant bits (excluding the synchronization header) of the marker M1 and the 32 least significant bits of the data block 1, and the data/marker block 120b includes the 32 most significant bits of the data block 1 and the 32 least significant bits of the marker M1. Further, the data blocks 5 and 9 that follow the data block in the stream 110a are split among the sub-streams 114a and 114b so that the data block 5 is transmitted after the data/marker block 120a in the sub-stream 114a and the data block 9 is transmitted after the data/marker block 120b in the sub-stream 114b.

At a stage 122, the data/marker blocks 120a-b and the data blocks 5 and 9, as well as data/marker blocks and data blocks in other lanes 110b-d, are transmitted via lanes such as the lanes 16 depicted in FIG. 1B, for example. The sub-streams 114a and 114b in the scenario 100 are directed to the opposite endpoints (e.g., SERDES) of the receiving data processor, and accordingly are received as illustrated at a stage 124. However, as indicated above, sub-streams in general can be directed via straight (e.g., 16c and 16d) or cross-over (e.g., 16a and 16b) connections.

The data/marker blocks 120a-b are restored to the marker M1 and the data block 1 at a stage 126. As illustrated in FIG. 1B, the data blocks 1-12 and the markers M1-M4 can sometimes be misaligned at the stage 126. In other words, data blocks and markers transmitted in parallel in different ones of the streams 110a-110d do not necessarily arrive at the receiving processing unit at the same time. For example, the marker M2 and the data blocks 2 and 6 in the scenario 100 lag behind the marker M1 and the data blocks 1, 5, and 9, for example.

The alignment between the streams 110a-d is restored at an alignment stage 128 using the markers M1-M4. As a result, the order and alignment of the data blocks 1-12 at a subsequent stage 130 is the same as at the stage 102. In this manner, an XLGMII data stream is accurately and efficiently transmitted via eight lower-rate lanes. If, for example, the XLGMII stream 20 is directed to an optical port while the port 14 is an electrical port, the PCS 10 can be used as an interface adapter even though the hardware internal to the PCS 10 cannot support the high data rate of the XLGMII stream 20 and the port 14.

Next, embodiments of Tx and Rx sub-MLDs are discussed with reference to FIG. 3 and FIG. 4 respectively. An example method for generating and transmitting data/marker blocks, according to an embodiment, is discussed with reference to FIGS. 5 and 6, and a method for processing such data/marker blocks at a receiving processing unit, according to an embodiment, is discussed with reference to FIG. 7. Another technique for restoring alignment between data streams that include data blocks and markers and are split between a pair of lanes, according to an embodiment, is then discussed with reference to FIGS. 8-10.

Figure 3:
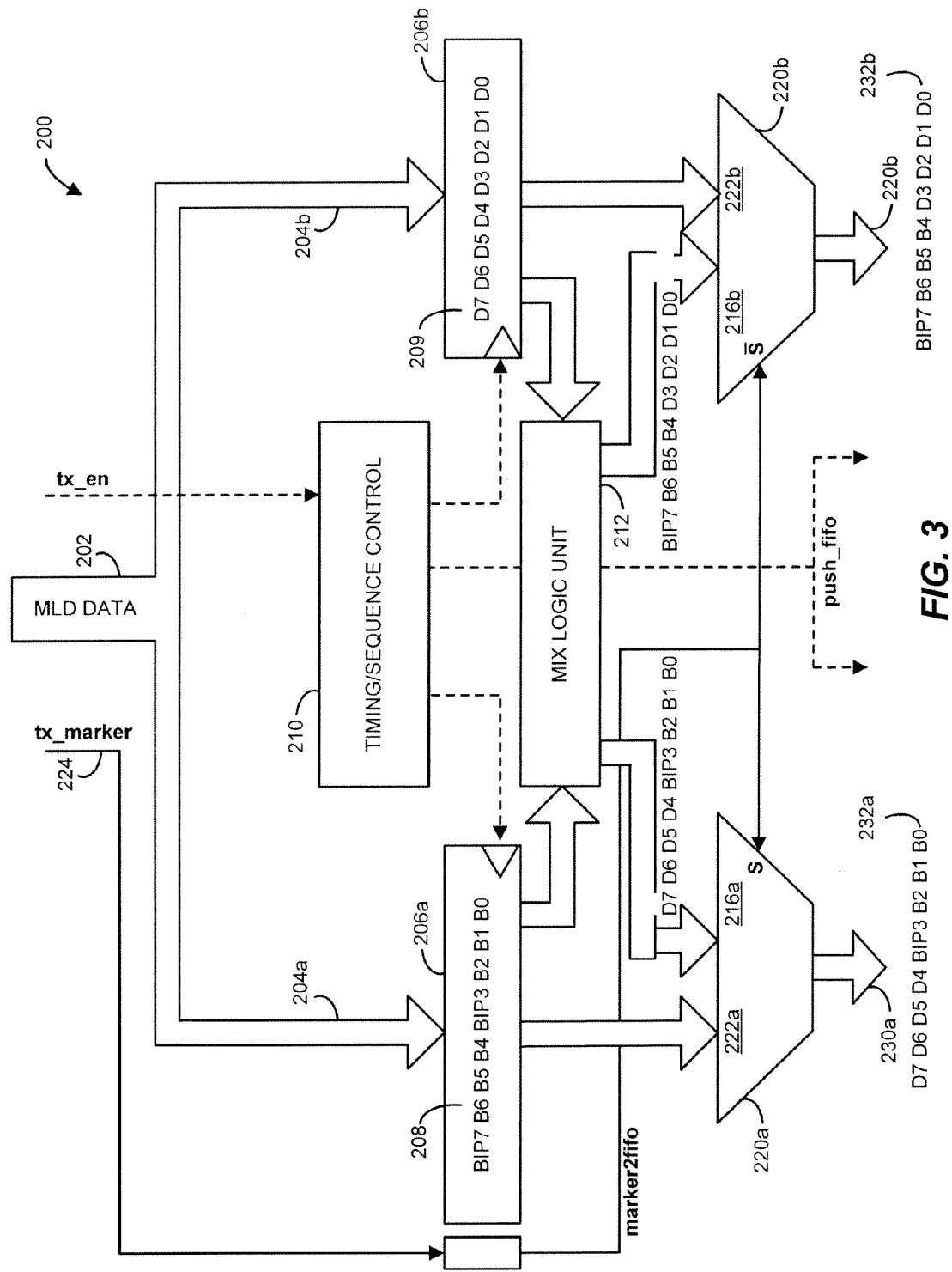
FIG. 3 is a block diagram of a transmit sub-MLD module in accordance with an embodiment of the present disclosure.

Referring to FIG. 3, an embodiment of a Tx sub-MLD 200 can be utilized in the processing unit 12, for example. In accordance with this embodiment, the Tx sub-MLD 200 receives a data stream via a channel 202 coupled to a Tx MLD unit such as the Tx MLD 32 depicted in FIG. 1B, for example, via one of the 10 Gb lanes 38. The received data stream is duplicated to sub-channels 204a and 204b that are coupled to respective 64-bit registers 206a and 206b. In an embodiment, the sub-channels 204a and 204b perform the function of the 5 Gb lanes 16 inside the Tx sub-MLD 200, and a packet duplicator (not shown for ease of illustration) is coupled to the channel 202 and each of the sub-channels 204a, 204b. Thus, if data blocks include a 2-bit synchronization header and a 64-bit data portion, the registers 206a and 206b are configured to store at least the 64-bit data portions, according to an embodiment. In general, the size of registers used in a Tx sub-MLD module can be selected based on the size of data blocks used in the particular implementation.

A timing/sequence control module 210 implements, in part, round-robin distribution logic and causes alternate data blocks to be stored in the registers 206a and 206b. If processing the stream 110a depicted in FIG. 2, for example, the timing/sequence control module 210 causes the data block 1 to be stored in the register 206a and the marker M1 in the register 206b at a time $T_1$, causes the data block 5 to be stored in the register 206a and the data block 9 in the register 206b at a time $T_2$, etc. It is noted that each of the registers 206a and 206b is loaded at half the speed at which data blocks propagate via the relatively high-rate (e.g., 10 Gb in an embodiment) channel 202.

FIG. 3 illustrates an example format of a marker 208 currently stored in the register 206a. In this embodiment, the lower three bytes of the marker 208 store certain pre-defined bytes B0, B1, and B2. Further, the bit interleave parity (BIP) byte BIP3 is in the most significant position in the lower portion of the marker 208. Similarly, the upper portion of the marker 208 includes pre-defined bytes B4, B5, and B6 as well as a reverse of the byte BIP3, BIP7, in the most significant position. In an embodiment, each of the groups of bytes B0-B2 and B4-B6 indicates the identity of the corresponding lane. Referring back to FIG. 2, for example, the lanes 110a-d can be identified from either the upper or the lower portion of the marker 208. In other embodiments, only one portion of a marker identifies the lane with which the marker is associated.

With continued reference to FIG. 3, a mix logic unit 212 receives data stored in the respective registers 206a and 206b and concatenates the two data blocks or the marker and the data block stored in these registers to generate two mixed data/data or data/marker blocks. In the example state of the Tx sub-MLD 200 illustrated in FIG. 3, for example, the register 206a stores the marker 208 and the register 206b stores a data block 209. The mix logic unit 212 supplies one of the two outputs to an input 216a of a multiplexer 220a and the other of the two outputs to an input 216b of a multiplexer 220b. In an embodiment, the mix logic unit includes two registers, each coupled to the two inputs via which the respective contents of the registers 206a, 206b are supplied to the mix logic unit 212. For example, the upper portion of the marker 208 is transferred to the upper portion of the second register, and the lower portion of the marker 208 is transferred to the lower portion of the first register. Likewise, the lower portion of the data block 209 is transferred to the lower portion of the first register, and the upper portion of the data block 209 is transferred to the upper portion of the second register.

As illustrated in FIG. 3, the multiplexer 220a also receives the contents of the register 206a via another input 222a, and the multiplexer 220b similarly receives the contents of the register 206b via an input 222b. The selection between the inputs 216a and 222a (or 216b and 222b) is controlled by a signal labeled marker2fifo that indicates the presence of a synchronization marker in the register 206a, and that in turn is controlled by a tx_marker signal 224. In an embodiment, the tx_marker signal 224 carries two bits of the synchronization header that specify whether the associated block is a data block or a marker.

From the foregoing, it is noted that when the tx_marker signal 224 does not signal the presence of a data marker in the register 206a, the data blocks in the registers 206a and 206b are selected by the respective multiplexers 220a and 220b and are transmitted at the outputs 230a and 230b. On the other hand, when the tx_marker signal 224 indicates that the register 206a currently stores a marker, the outputs of the mix logic unit 212 are selected at the multiplexers 220a and 220b. As an example, FIG. 3 illustrates the latter situation and depicts data/marker blocks 232a and 232b that include portions of the marker 208 and the data block stored in the register 206b.

To allow receivers to distinguish between data/marker blocks from other blocks, the Tx sub-MLD 200, in some embodiments, sets the synchronization header of each of the data/marker blocks 232a and 232b to specify a control block, i.e., a block that carries information other than data. However, because the receiver of the data/marker blocks 232a and 232b must be able to restore the marker 208 as well as the data block 209, the Tx sub-MLD 200, in one embodiment, utilizes one of the bits of the data/marker blocks 232a and 232b to indicate whether the block concatenated with the marker 208 is a data block or another control block. More specifically, the Tx sub-MLD 200 sets bit 34 in the data/marker block 232b (occupied by bit 2 of the marker byte B4), according to an embodiment. A Tx sub-MLD in other embodiments can use other bits for a similar purpose, of course.

In accordance with an embodiment, a synchronization header includes two bits but is only to specify only one of two values. In one of these embodiments, the Tx sub-MLD 200 uses only one bit to signal the 2-bit synchronization header. In an embodiment, the Tx sub-MLD 200 additionally uses bit 2 of the marker byte B0 to convey the second bit of the synchronization header, thereby protecting the MAC layer from single-bit errors. For example, in one embodiment, the Tx sub-MLD 200 uses bit 32 of the marker to convey the first bit of the synchronization header and bit 2 to convey the second bit of the synchronization header (or vice versa). The receiving processing unit can accordingly restore the complete synchronization header by examining these two bits.

Figure 4:
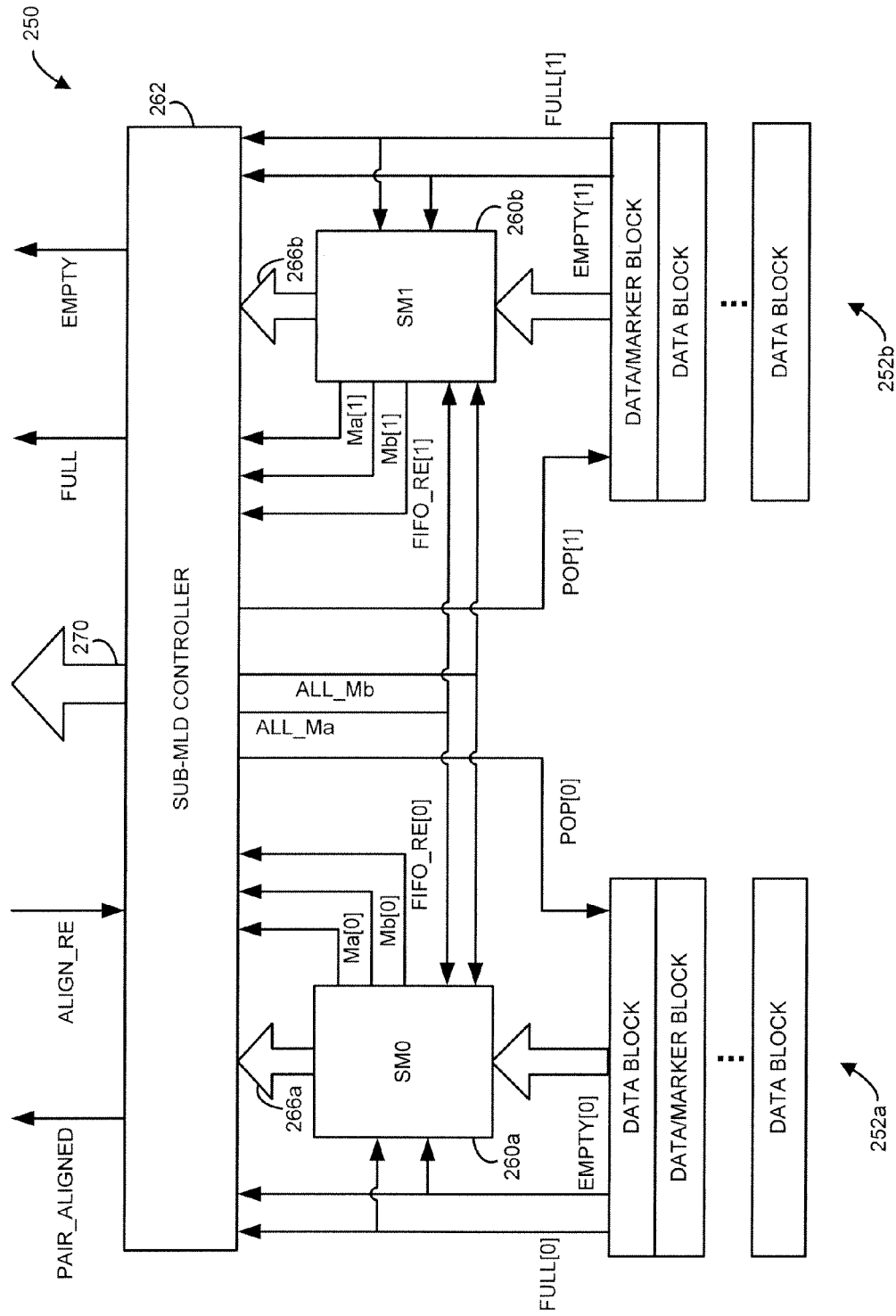
FIG. 4 is a block diagram of a receive sub-MLD module in accordance with an embodiment of the present disclosure.

Referring to FIG. 4, an embodiment of an Rx sub-MLD 250 can be utilized in the data module 18, for example, or any apparatus that requires re-alignment (or "de-skewing") and reassembly of blocks transmitted by a module identical or similar to the Tx sub-MLD 200. The Rx sub-MLD 250 receives transmission units such as data and data/marker blocks via a pair of first in, first out (FIFO) queues 252a and 252b. Each of the FIFO queues 252a and 252b supplies a block of information to a respective state machine 260a or 260b in response to receiving a pop command from a sub-MLD controller 262 via a corresponding control line pop[0] or pop[1]. The FIFO queue 252a or 252b indicates that the queue is empty via a control line empty[0] or empty[1]. Conversely, when the queue is full, the FIFO queue 252a or 252b uses a signal full[0] or full[1]. The FIFO queues 252a and 252b also supply empty and full signals to the state machines 260a and 260b.

In this example embodiment, the state machines 260a and 260b perform similar operations to service the two FIFO queues 252a and 252b and, more particularly, to detect portions of a synchronization marker split between two lanes. Each of the state machines 260a and 260b is configured to detect the upper portion of a marker (e.g., a pattern that corresponds to the 32 most significant bits of a marker) or the lower portion of the marker (e.g., a pattern that corresponds to the 32 least significant bits of a marker). Referring back to FIG. 2, for example, the upper portion of the marker corresponds to M1' and the lower portion of the marker corresponds to M1". In FIG. 4, signals related to the upper portion are labeled Ma and signals related to the lower portion are labeled Mb.

Referring to the state machine 260a by way of example, when an upper portion of a synchronization marker is detected in the transmission unit retrieved from the FIFO queue 252a, the state machine 260a activates the signal Ma[0]. In an embodiment, Ma[0] is a one-bit signal, with the value 1 corresponding to the presence of an upper portion of a marker and the value 0 corresponding to absence of an upper portion of a marker in the transmission unit. Similarly, if the state machines 260a detects a lower portion of a data marker, the signal Mb[0] is activated. Upon detecting either an upper or a lower portion of marker and notifying the sub-MLD controller 262 accordingly, the state machine 260a "locks" (e.g., prevents further communications on) a lane 266a, through which data blocks are supplied to the sub-MLD controller 262, until the state machine 260b detects the remaining portion of the marker and notifies the sub-MLD controller 262 via a signal Ma [1] or Mb[1]. When the sub-MLD controller 262 receives both notifications (Ma[0] and Ma[1] or, alternatively, Mb[0] and Mb[1]), an appropriate one of the signals ALL_Ma or ALL_Mb is activated to indicate to the state machines 260a and 260b that an entire marker has been collected.

It is noted that if the state machine 260a detects a lower portion of marker and the state machine 260b detects an upper portion of the marker, the sub-MLD controller 262 swaps the transmission units received via the lanes 266a and 266b to restore the correct ordering of data or control blocks. In the scenario 100 illustrated in FIG. 2, for example, the earlier-in-time data block 5, transmitted in parallel over a pair of lanes with the later-in-time data block 9, is received on a higher-numbered lane. Thus, similar to the processing stage 126 of FIG. 2, the sub-MLD controller 262 swaps the transmission units in response to receiving Mb[0] and Mb[1], but leaves the original order of transmission units intact in response to receiving Ma[0] and Ma[1].

The state machines 260a and 260b make transmission units available to the sub-MLD controller 262 and use the fifo_re signal to indicate data block availability. As discussed above, the state machines 260a and 260b can safely unlock (e.g., permit further communications on) the lanes 266a and 266b when the sub-MLD controller 262 activates the signal ALL_Ma or ALL_Mb. Upon retrieving the transmission units from the state machines 260a and 260b and, if necessary, swapping the data units to restore the correct order, the sub-MLD controller 262 restores the lower-rate lanes 266a and 266b to a higher-order stream at an output channel 270. In an embodiment, the lanes 266a and 266b support 5 Gb streams, and the output channel 270 supports a 10 Gb stream.

With continued reference to FIG. 4, the sub-MLD controller 262 in this embodiment also outputs a pair_aligned signal to a MAC controller (not shown) or another module to signal completion of alignment of a certain portion of the stream, as well as full and empty signals to indicate that the buffer is full or empty, respectively. Further, the sub-MLD controller 262 outputs the aligned and re-ordered data at the output channel 270 in accordance with a signal align_re. For example, a MAC controller can use this signal to control the rate and timing at which the sub-MLD controller 262 outputs data. In some embodiments, the MAC controller 262 activates the signal align_re to indicate that the data is being read from the output channel 270 and accordingly deactivates the signal align_re to indicate that the data has been fully retrieved from the output channel 270, so that the sub-MLD controller 262 can pop the next pair of transmission units from the FIFO queues 252a and 252b respectively.

Figure 5:
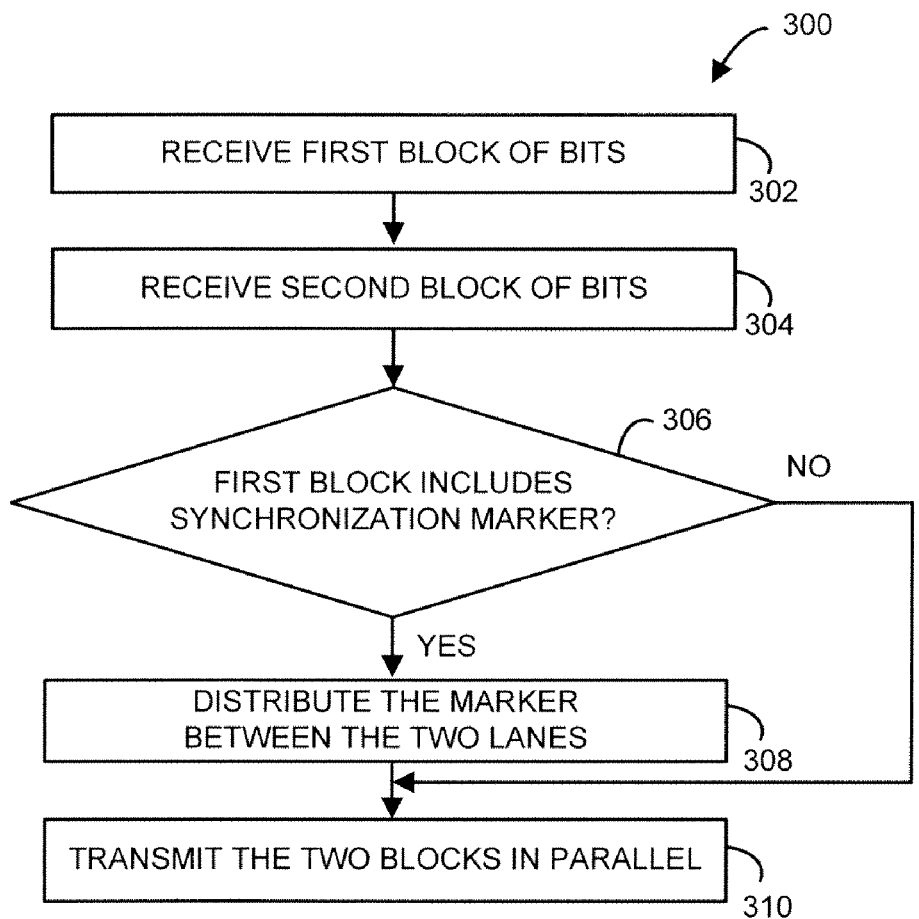
FIG. 5 is a flow diagram of a method for transmitting an alignment marker and a data block over a pair of lanes in accordance with an embodiment of the present disclosure.

FIG. 5 illustrates an example method 300 that can be implemented in the Tx sub-MLD 50a-d, the Tx sub-MLD 200, or a similar module operating in a transmitting data processor and responsible for ensuring that a receiving data processor can de-skew traffic split into two lanes. It is noted that the method 300 is discussed with reference to only two lanes for ease of illustration only, and that the techniques illustrated in FIG. 5, as well the techniques discussed with reference to FIGS. 1-4, also can be applied to higher numbers of lanes.

At 302, a first block of bits is received. A second block of bits is received at 304. Each of the first block of bits can be a data block or a control block such as a marker. In an embodiment, each of the first block of bits and the second block of bits is a 64-bit sequence preceded by a 2-bit synchronization header. In other embodiments, data blocks, control block, and, if included, the corresponding headers can be of any desired length.

At 306, the type of the first block of bits is determined using the synchronization header, for example. If it is determined that the first block is a marker, the marker is distributed between the two lanes at 308 using the techniques discussed above. In an embodiment, the upper portion of the marker is merged with a lower portion of the second block of bits, the lower portion of the marker is merged with the upper portion of the second block of bits, and the two mixed blocks are transmitted in parallel over the two lanes at 310. In other embodiments, a marker is merged with a data block using any other suitable technique such as combining odd bytes of the marker with even bytes of the second block of bits to define a first mixed block and combining even bytes of the marker with odd bytes of the second block of bits to define a second mixed block, for example. Further, if it is determined at 306 that the first block is not a marker, the method 300 proceeds directly to 310.

Figure 6:
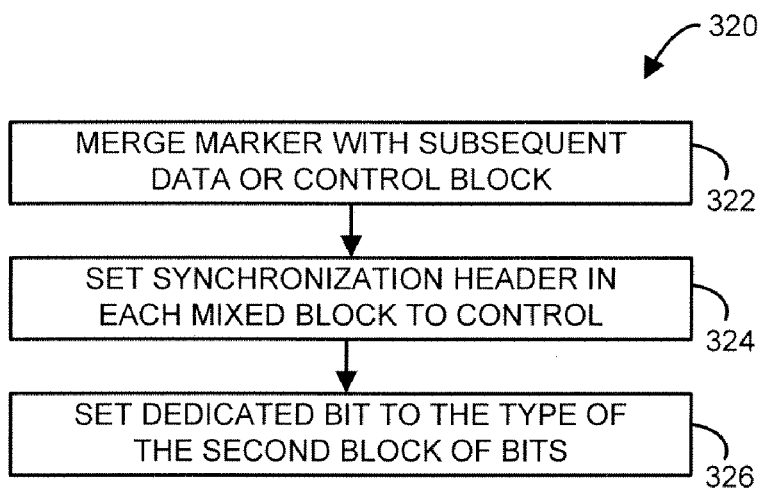
FIG. 6 is a flow diagram of a method for merging a marker with a data block or a control block in accordance with an embodiment of the present disclosure.

FIG. 6 is an example method 320 for generating a mixed block using a marker and a data or control block. In an embodiment, the method 320 can be used in implementing operation 308 of FIG. 5. At 322, a marker is merged with a data block or a control block as discussed above. Although in an embodiment the second block of bits includes data or control information, the synchronization header of each of the two mixed blocks is set to "control" at 324. At 326, a certain bit in one or both of the mixed blocks is set to specify the original type of the second block of bits (e.g., the block of bits received at 304). In an embodiment, the certain bit (e.g., bit 32) is set to zero if the second block of bits is a data block, or to one if the second block of bits is a control block.

Figure 7:
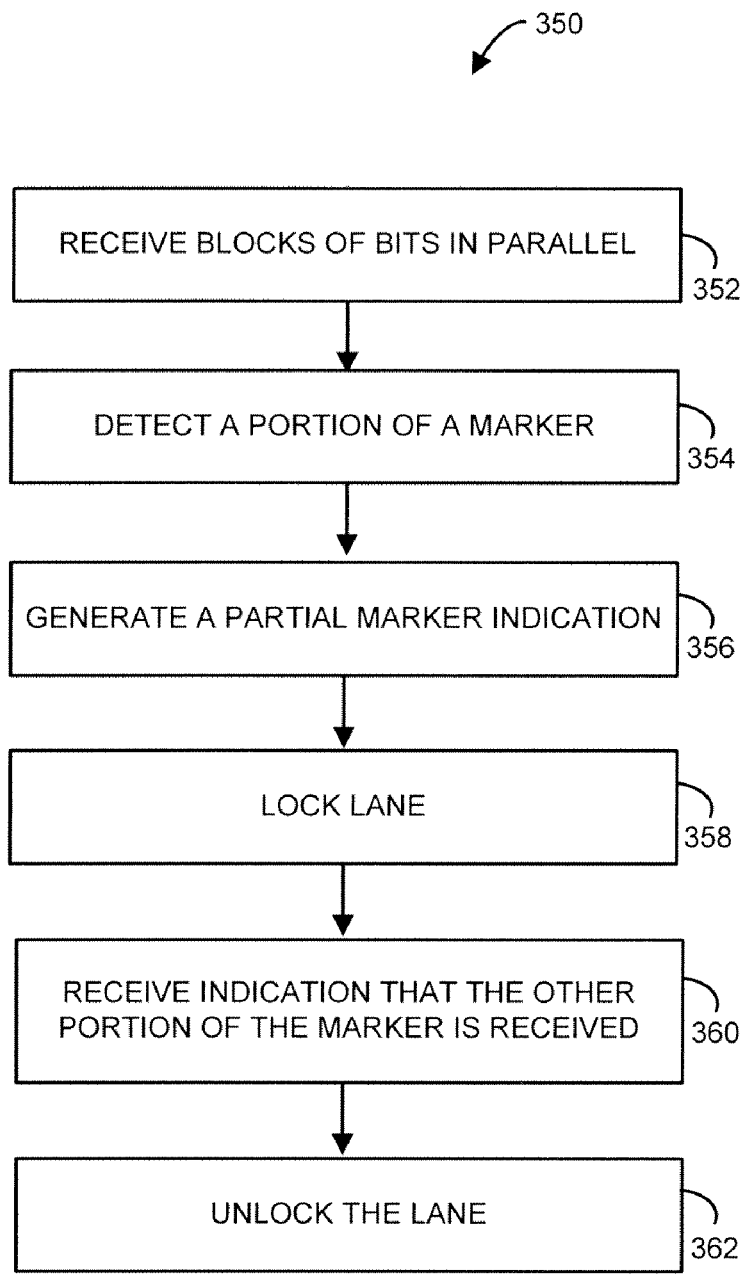
FIG. 7 is a flow diagram of a method for receiving an alignment marker and a data block over a pair of lanes in accordance with an embodiment of the present disclosure.

FIG. 7 is a flow diagram or an example method 350 according to which the Rx sub-MLD 54a-d, the Rx sub-MLD 250, or a similar module, operates, according to an embodiment. At 352, blocks of bits are received via parallel lower-rate lanes. In an embodiment, two blocks of bits are received via two 5 Gb lanes, and the method 350 is generally directed to facilitate generating a single 10 Gb stream from two 5 Gb streams.

At 354, a portion of a data marker is detected. In an embodiment, the detected portion of the data marker is the lower portion (e.g., 32 least significant bits) of the marker or the upper portion (e.g., 32 most significant bits) of the marker. An appropriate indication that a partial marker has been detected is generated at 356, and the lane in which a portion of the marker has been detected is locked at 358. When a control module such as the sub-MLD controller 262 (see FIG. 4) receives both indications related to the respective portions of the marker (360), the lane in which the first portion has been detected is unlocked at block 362, and the now-aligned data can be processed for a certain period of time until portions of another marker are received.

Generally with respect to FIGS. 1-7, the techniques discussed above advantageously allow an MLD module to be reused as a sub-MLD block with a relatively small number of changes to the hardware and/or firmware of the MLD module, in some embodiments. For example, the Tx MLD 32 and the Rx MLD 40 depicted in FIG. 1B, in at least some of the embodiments, implement state machine logic to detect a marker, lock a lane until markers in the other lanes are received, and unlock the lane upon receiving an appropriate indication. Further, modules similar to Tx MLD 32 and the Rx MLD 40 or the PCS components 30 and 44 in some embodiments implement order restoration logic. Thus, common architecture or, in some embodiments, common chips with additional external logic can be used to implement MLD and sub-MLD components discussed above. For example, in an embodiment, a single chip is capable of operating in a Tx MLD or Tx sub-MLD mode according to a selection signal supplied via one of the pins.

It is also noted that as one solution to the problem of synchronizing pairs of lanes such as the lanes 16a and 16b, 16c and 16d, etc. (see FIG. 1B), a Tx sub-MLD module and a corresponding Rx sub-MLD module can utilize another layer of markers. Thus, in an embodiment, a Tx sub-MLD module does not split or mix markers generated by the corresponding Tx MLD module, and instead periodically inserts markers into each of the two streams generated by the Tx sub-MLD module. In this embodiment, each marker is specific to the first or the second lane in the pair. Although this approach ensures that alignment can be restored at the receiving end, the loss of bandwidth due to the additional markers may not be acceptable in some applications.

Figure 8:
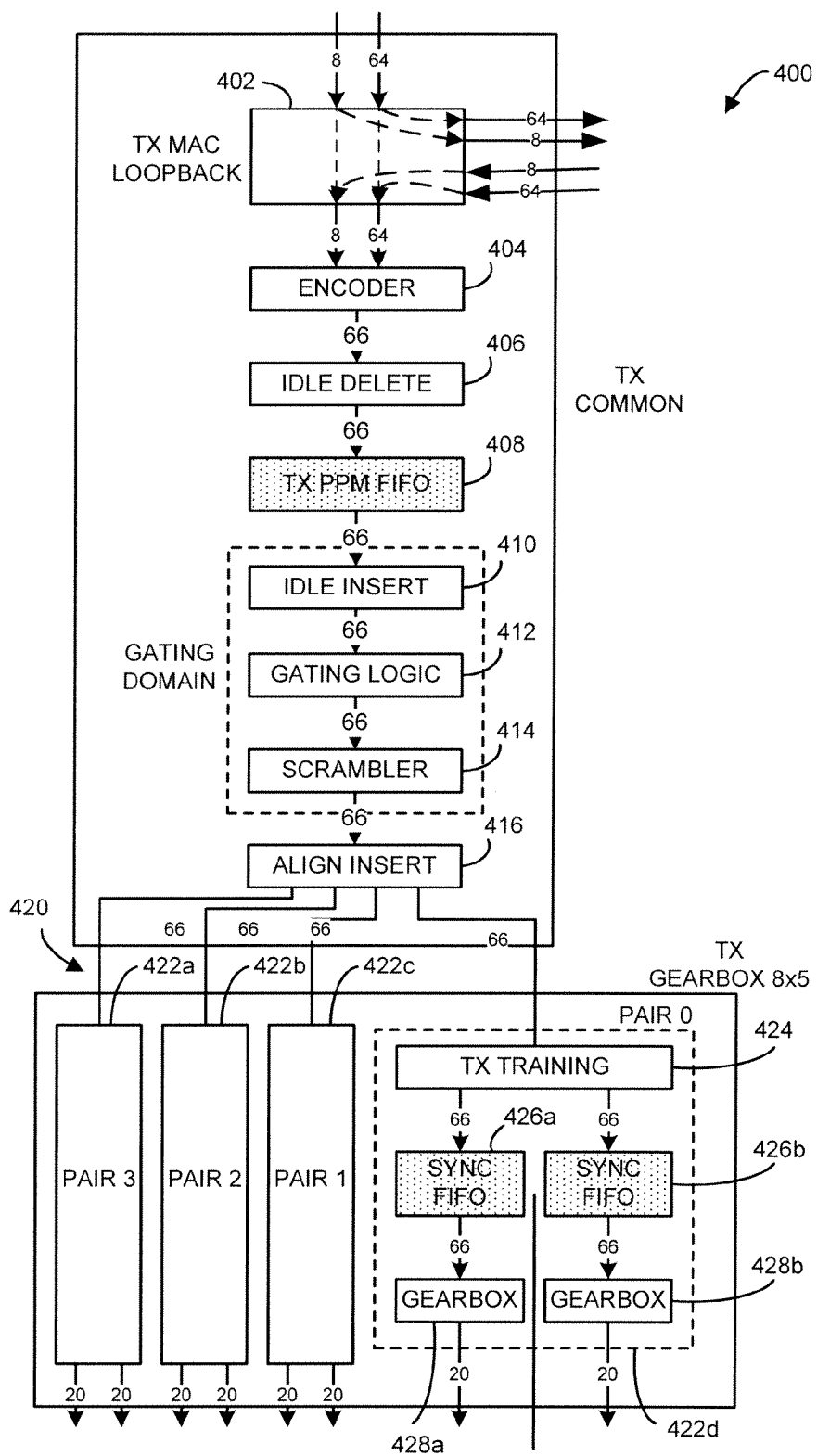
FIG. 8 is a block diagram of a transmit MLD pipeline with a transmit training module in accordance with an embodiment of the present disclosure.

As another approach, pair training (i.e., a bidirectional exchange of information between two devices to identify conditions that allows proper synchronization) can be used to ensure that streams transmitted over a pair of lanes are properly synchronized. FIG. 8 illustrates an example Tx MLD pipeline 400 that includes a Tx MAC loopback module 402 adapted to direct data forward to an encoder 404 as well as to an Rx pipeline discussed below with reference to FIG. 9. The Tx MLD pipeline 400 further includes an idle symbol delete module 406, a Tx Part per Million (PPM) FIFO block 408, a gating domain including an idle insert module 410, gating logic 412, and a scrambler 414. The Tx MLD pipeline 400 further includes an idle symbol insert module 416. In this embodiment, the Tx MLD pipeline 400 includes four 10 Gb lanes 420, each coupled to a respective lane pair module 422a-d.

Each of the lane pair modules 422a-d services a pair of 5 Gb lanes and implements pair training logic to enable de-skewing at a receiving end of the plurality of 5 Gb lanes. The lane pair module 422d, for example, includes a Tx training module 424, SYNC FIFO modules 426a and 426b dedicated respectively to the two lanes, and gearboxes 428a and 428b similarly dedicated to the respective lanes.

Figure 9:
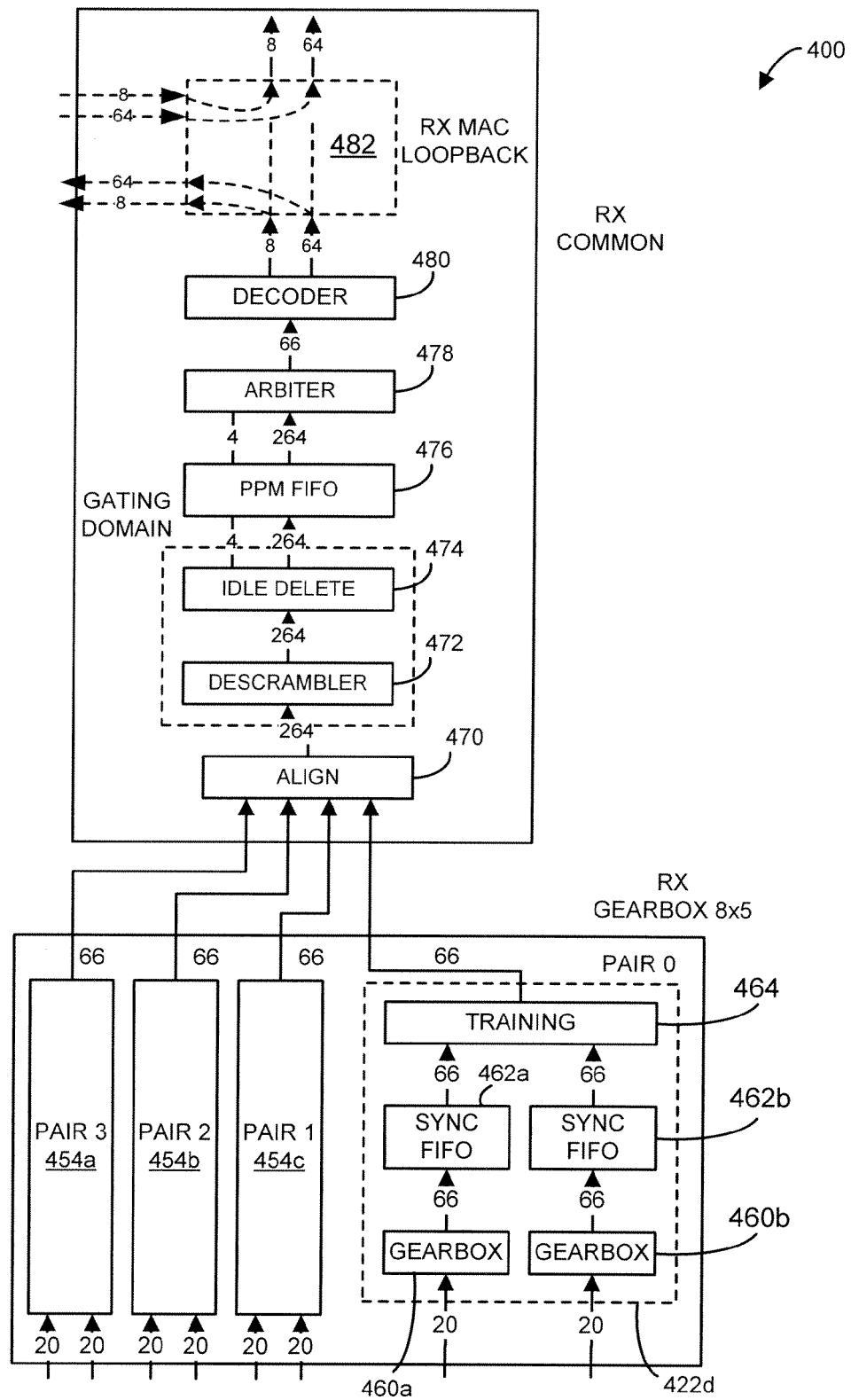
FIG. 9 is a block diagram of a receive MLD pipeline with an receive training module in accordance with an embodiment of the present disclosure.

Prior to discussing the operation of the Tx training module 424, an example Rx MLD pipeline 450 is discussed with reference to FIG. 9. Four pairs of 5 Gb lanes 452 are coupled to lane pair modules 454a-d, respectively, each of which is configured to support pair training. The lane pair module 454d, for example, includes gearboxes 460a and 460b dedicated to the two lanes, SYNC FIFO modules 462a and 462b coupled to the gearboxes 460a and 460b respectively, and a training module 464 coupled to the SYNC FIFO modules 462a and 462b.

Each of the lane pair modules 454a-d is coupled to an alignment module 470 via a respective 10 Gb lane. The alignment module 470 is in turn coupled to a gating domain unit that includes a descrambler 472 and an idle symbol delete module 474. Next, the stream is processed by a PPM FIFO module 476 followed by an arbiter 478 and a decoder 480. Similar to Tx MAC loopback module 402, an Rx MAC loopback module 482 is adapted to direct the stream forward to other processing modules as well as to a Tx MAC loopback module such as the Tx MAC loopback module 402, for example.

Figure 10:
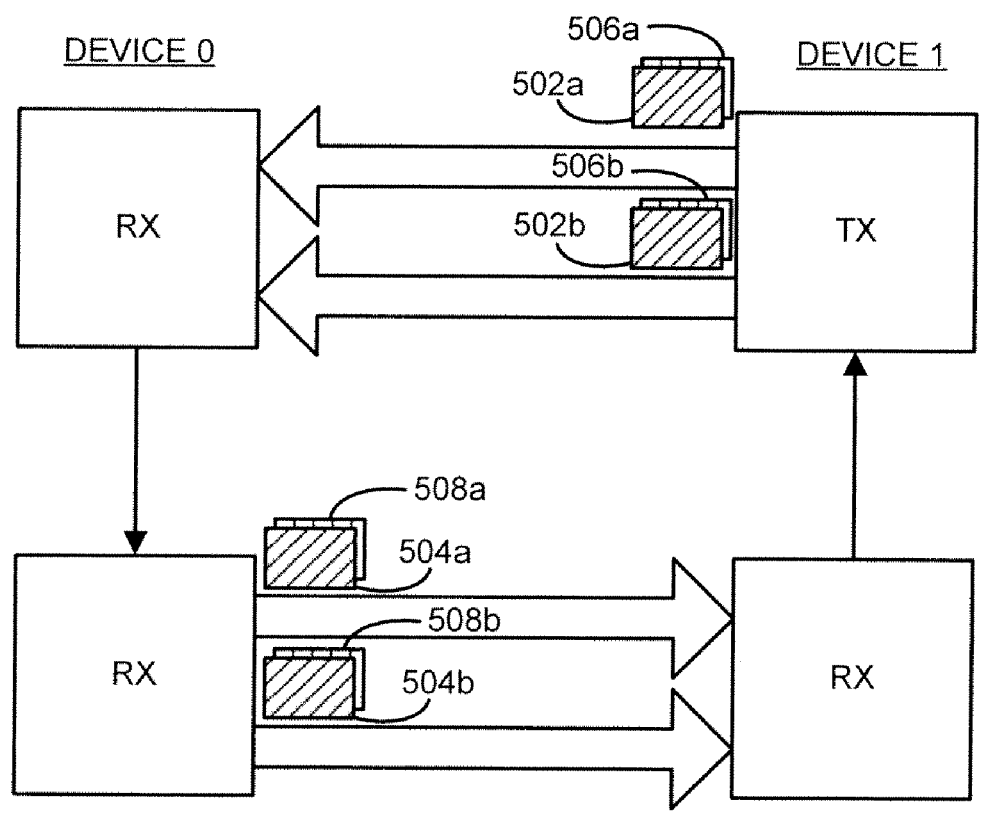
FIG. 10 is a block diagram of a technique for training a pair of devices in accordance with an embodiment of the present disclosure.

In operation, as illustrated in FIG. 10, a Tx MLD pipeline of Device 1 (implemented as the Tx MLD pipeline 400, for example) transmits a pair of synchronization sequences 502a and 502b to an Rx MLD pipeline of Device 0 (implemented as the Rx MLD pipeline 450, for example). At the same time, a Tx MLD pipeline of Device 0 transmits a pair of synchronization sequences 504a and 502b to a Rx MLD pipeline of Device 1. In an embodiment, Devices 1 and 2 are similar to the modules 12 and 18 illustrated in FIG. 1B, and are connected by four pairs of 5 Gb lanes. For simplicity, FIG. 10 illustrates pair training on only one pair of lanes in each direction.

Once the synchronization sequences 502a-b and 504a-b are received, Device 0 forwards the sequences 502a-b to the Tx MLD pipeline of Device 0, and Device 1 similarly forwards the sequences 504a-b to the Rx MLD pipeline of Device 0. To this end, Devices 0 and 1 utilize a loopback-capable Rx MAC module such as the module 482, for example. Additionally, an Rx training controller of Device 0 (implemented as the training controller 464, for example) detects the difference in timing between receiving the sequences 502a and 502b. An Rx training controller of Device 1 performs a similar operation using the sequences 504a and 504b.

The Tx training controller of Device 1 (implemented as the training controller 424, for example) causes filler sequences 506a-b to be transmitted to Device 0 and the Tx training controller of Device 0 causes filler sequences 508a-b to be transmitted to Device 1. Using the filler sequences 506a-b and 508a-b, each of the Devices 0 and 1 provides information indicative of the skew on each lane and thus enables the other one of the Devices 0 and 1 to correctly de-skew data streams.

In general, it is further noted that the data processors 12 and 18 and/or Devices 0 and 1 can be switches, packet processor, or other modules capable of transmitting, receiving, and processing data streams. In at least some of the embodiments, these modules are Ethernet switches. In one such embodiment, these modules conform to the IEEE 802.3ba standard.

At least some of the various blocks, operations, and techniques described above can be implemented utilizing hardware, a processor executing firmware instructions, a processor executing software instructions, or any combination thereof. Further, some of the components, such as MLD and sub-MLD modules discussed above, can be implemented using application-specific integrated circuits (ASIC). When implemented utilizing a processor executing software or firmware instructions, the software or firmware instructions may be stored on any computer readable medium such as on a magnetic disk, an optical disk, or other storage medium, in a RAM or ROM or flash memory, processor, hard disk drive, optical disk drive, tape drive, etc. Likewise, the software or firmware instructions for some of the components discussed above may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. By way of example, and not limitation, communication media includes wired media such as a wired network or direct-wired connection, and wireless media such as acoustic, radio frequency, infrared and other wireless media. The software or firmware instructions may include machine readable instructions that, when executed by the processor, cause the processor to perform various acts.

While multilane switch apparatus and methods have been described with reference to specific examples, which are intended to be illustrative only and not to be limiting of the disclosure, it is noted that changes, additions and/or deletions may be made to the disclosed embodiments without departing from the spirit and scope of the disclosure.

What is claimed is:

1. A physical coding sub-layer module comprising:
   a first plurality of data transfer lanes in a port of a multi-lane Ethernet switch for transferring blocks of data between devices in the port;
   a synchronization marker generator for generating synchronization markers to be periodically transmitted over the first plurality of data transfer lanes; and
   a data marker module configured to generate at least two data marker blocks each from a combination of (i) a respective portion of a synchronization marker, received via one of the first plurality of data transfer lanes, and (ii) a respective portion of a block of data, received via the one of the first plurality of data transfer lanes, and to provide the at least two data marker blocks to respective first and second ones of a second plurality of data transfer lanes.

2. The physical coding sub-layer module of claim 1, further comprising a distribution controller to distribute the blocks of data among the first plurality of data transfer lanes.

3. The physical coding sub-layer module of claim 1, further comprising a multi-lane distribution module to partition a stream of symbols into the blocks of data each including a plurality of symbols, wherein at least some of the blocks of data are transmitted over the first plurality of data transfer lanes in parallel.

4. The physical coding sub-layer module of claim 1, wherein the data marker module includes a mix logic unit configured to:
   receive the synchronization marker;
   receive the data block;
   generate a first one of the at least two data marker blocks from an upper half of the synchronization marker and a lower half of the data block; and
   generate a second one of the at least two data marker blocks from a lower half of the synchronization marker and an upper half of the data block.

5. The physical coding sub-layer module of claim 4, wherein the data marker module further includes a multiplexer comprising:
   a first input to receive the synchronization marker;
   a second input to receive the first one of the at least two data marker blocks;
   a control input to receive a selection signal indicative of a selection between the first input and the second input; and
   an output to provide one of the synchronization marker and the first one of the at least two data marker blocks to one of the second plurality of data transfer lanes accordance with the selection signal.

6. The physical coding sub-layer module of claim 1, wherein the data marker module is further configured to generate a synchronization header associated with a control type for each of the at least two data marker blocks.

7. The physical coding sub-layer module of claim 6, wherein the data marker module is further configured to set a bit in the synchronization marker to a first value to indicate that the block of data is associated with data prior to generating the at least two data marker blocks.

8. A method for transmitting data using a physical coding sub-layer module, the method comprising:
   generating a first data marker by combining (i) a first portion of a synchronization marker, received via a first data transfer lane, and (ii) a first portion of a data block, received via the first data transfer lane; wherein the synchronization marker and the data block are associated with a first stream transmitted via the first data transfer lane;
   generating a second data marker by combining (i) a second portion of the synchronization marker and (ii) a second portion of the data block;
   transmitting the first data marker via a first second data transfer lane to a target device in a second stream; and
   transmitting the second data marker via a third data transfer lane to the target device in a third stream parallel to the second stream.

9. The method of claim 8, wherein the synchronization marker and the data block are restored using the first data marker and the second data marker at the target device.

10. The method of claim 8, further comprising associating each of the first data marker and the second data marker with a synchronization header of a type control.

11. The method of claim 10, further comprising using a bit of the synchronization marker to specify that the data block is associated with a synchronization header of a type data.

12. The method of claim 8, wherein the first stream is associated with a higher data rate than the second stream or the third stream.

13. The method of claim 8, further comprising:
   generating a respective synchronization marker for each of a first plurality of streams including the first stream; and
   generating a respective pair of data markers using the respective synchronization marker and a respective data block for each respective pair of a second plurality streams including the second stream and the third stream.

14. The method of claim 8, further comprising:
   receiving a plurality of data blocks in the first stream; and
   distributing the plurality of data blocks between the first second data transfer lane and the third data transfer lane.

15. The method of claim 8, wherein generating the first data marker includes concatenating upper bits of the synchronization marker with lower bits of the data block; and
   wherein generating the second data marker includes concatenating upper bits of the data block with lower bits of the synchronization marker.

16. An Ethernet switch comprising:
   an input to receive, via a first data transfer lane, a first stream of blocks of symbols including a synchronization marker and a data block;
   a first output to transmit a second stream of blocks of symbols via a second data transfer lane;
   a second output to transmit a third stream of blocks of symbols via a third data transfer lane; and
   a data marker module configured to generate at least (i) a first data marker from a combination of (a) a first portion of the synchronization marker and (b) a second portion of the data block and (ii) a second data marker from a combination of (a) a second portion of the synchronization marker and (b) a first portion of the data block, and provide the at least the first data marker and the second marker to the first output and the second output respectively.

17. The Ethernet switch of claim 16, wherein the data marker module includes:
   a first register;
   a second register;
   a mix logic unit coupled to the first register and the second register to generate the first data marker and the second data marker; and
   a multiplexer coupled to the first register and the mix logic unit; and wherein the multiplexer is configured to provide data stored in the first register to the second data transfer lane if the first register stores a data block, and further configured to provide the first data marker to the second data transfer lane if the first register stores the synchronization marker.

18. An apparatus comprising:
a pair of inputs to receive a first data stream and a second data stream respectively;
a pair of state machines, each coupled to the respective input; and
a controller configured to merge the first data stream with the second data stream to generate a third data stream; wherein
each of the pair of state machines is configured to:
detect a portion of a synchronization marker in a block of symbols transmitted in the respective first or second data stream;
provide an indication to the controller that the portion of the synchronization marker has been received; and
prevent blocks of symbols in the respective first or second stream to be propagated until the controller indicates that the synchronization marker has been fully received;
wherein the controller is configured to
restore the synchronization marker by merging respective portions of the synchronization marker in the first data stream and the second data stream, and
include the restored synchronization marker in the third data stream.

19. The apparatus of claim 18, wherein each of the portions of the synchronization marker is transmitted in the first data stream and the second data stream along with a respective portion of a data block.

20. The apparatus of claim 18, wherein the block of symbols includes an upper portion occupied by the portion of the synchronization marker and a lower portion occupied by a data block.

* * * * *